US010511765B2

(12) United States Patent
Kim et al.

(10) Patent No.: US 10,511,765 B2
(45) Date of Patent: Dec. 17, 2019

(54) ELECTRONIC APPARATUS AND METHOD OF EXTRACTING STILL IMAGES

(71) Applicant: Samsung Electronics Co., Ltd., Gyeonggi-do (KR)

(72) Inventors: Goun-young Kim, Gyeonggi-do (KR); Karthik Narayanan, Chennai (IN); Tapan Shah, Surat (IN); Vamsee Kalyan Bandlamudi, Guntur (IN); Yun-mi Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 192 days.

(21) Appl. No.: 15/176,936

(22) Filed: Jun. 8, 2016

(65) Prior Publication Data
US 2016/0366334 A1    Dec. 15, 2016

(30) Foreign Application Priority Data

Jun. 10, 2015   (KR) ........................ 10-2015-0082137

(51) Int. Cl.
*H04N 5/232*    (2006.01)
*H04N 5/235*    (2006.01)
(Continued)

(52) U.S. Cl.
CPC ....... *H04N 5/23229* (2013.01); *G06F 16/783* (2019.01); *G06K 9/00744* (2013.01);
(Continued)

(58) Field of Classification Search
CPC ........... H04N 5/23219; H04N 5/23222; H04N 5/23229; H04N 5/23245; H04N 5/23254;
(Continued)

(56) References Cited

U.S. PATENT DOCUMENTS 7,710,488 B2 *  5/2010  Wang ..................... G03B 17/02
                                                     348/333.05
7,831,987 B2   11/2010  Shikata et al.
(Continued)

FOREIGN PATENT DOCUMENTS

CN          1620123         5/2005
KR       10-0436828         6/2004
(Continued)

OTHER PUBLICATIONS

International Search Report dated Sep. 9, 2016 issued in counterpart application No. PCT/KR2016/005695, 10 pages.
(Continued)

*Primary Examiner* — Lin Ye
*Assistant Examiner* — Chriss S Yoder, III
(74) *Attorney, Agent, or Firm* — The Farrell Law Firm, P.C.

(57) ABSTRACT

A method and an electronic device are provided for generating a still image from a video file. The electronic device includes an image sensor, a display, and a controller configured to generate a video file from an image signal input through the image sensor, assign frame characteristics to each frame included in the video file, selectively display at least one of the frames on the display, receive a selection of a frame among the displayed at least one of the frames, and generate a still image from the selected frame.

16 Claims, 17 Drawing Sheets

(51) Int. Cl.
*G06K 9/00* (2006.01)
*G06F 16/783* (2019.01)

(52) U.S. Cl.
CPC ....... *H04N 5/2353* (2013.01); *H04N 5/23219* (2013.01); *H04N 5/23222* (2013.01); *H04N 5/23245* (2013.01); *H04N 5/23254* (2013.01); *H04N 5/23267* (2013.01); *G06T 2207/10004* (2013.01)

(58) Field of Classification Search
CPC .... H04N 5/23267; H04N 5/2353; G06T 7/97; G06T 2207/10004; G06F 17/30784; G06K 9/00744
See application file for complete search history.

(56) References Cited

U.S. PATENT DOCUMENTS

| | | | | |
|---|---|---|---|---|
| 9,268,792 | B2* | 2/2016 | Morrison | G06F 17/30265 |
| 9,973,647 | B2* | 5/2018 | Shih | G06T 7/0002 |
| 2002/0191952 | A1* | 12/2002 | Fiore | H04N 5/76 |
| | | | | 386/217 |
| 2003/0174228 | A1* | 9/2003 | Brake | H04N 1/0044 |
| | | | | 348/333.11 |
| 2006/0034600 | A1 | 2/2006 | Wang | |
| 2009/0100462 | A1 | 4/2009 | Park et al. | |
| 2010/0026842 | A1 | 2/2010 | Ishizaka | |
| 2012/0177338 | A1 | 7/2012 | Park et al. | |
| 2012/0249853 | A1* | 10/2012 | Krolczyk | H04N 1/00448 |
| | | | | 348/333.01 |
| 2014/0293069 | A1* | 10/2014 | Lazar | G06F 17/30256 |
| | | | | 348/207.1 |
| 2014/0321762 | A1* | 10/2014 | Pozas Trevino | G11B 27/28 |
| | | | | 382/225 |
| 2014/0354845 | A1* | 12/2014 | Molgaard | H04N 1/215 |
| | | | | 348/222.1 |
| 2014/0362256 | A1* | 12/2014 | Schulze | H04N 5/23277 |
| | | | | 348/231.99 |
| 2015/0071547 | A1* | 3/2015 | Keating | G06K 9/46 |
| | | | | 382/195 |
| 2015/0104149 | A1 | 4/2015 | Sim | |
| 2016/0094801 | A1* | 3/2016 | Beysserie | H04N 5/91 |
| | | | | 386/226 |
| 2016/0173752 | A1* | 6/2016 | Caviedes | H04N 1/00204 |
| | | | | 348/207.11 |
| 2016/0239712 | A1 | 8/2016 | Kitano | |

FOREIGN PATENT DOCUMENTS

| | | |
|---|---|---|
| KR | 10-1002846 | 12/2010 |
| KR | 10-1298684 | 8/2013 |
| KR | 1020150043962 | 4/2015 |
| WO | WO 2015/045233 | 4/2015 |

OTHER PUBLICATIONS

European Search Report dated Oct. 25, 2016 issued in counterpart application No. 16173591.5-1903, 9 pages.
Chinese Office Action dated Aug. 30, 2019 issued in counterpart application No. 201610407107.7, 17 pages.

* cited by examiner t t+1 t t+1 t+2 t+3 t t+1 t+2 t+3

ELECTRONIC APPARATUS AND METHOD OF EXTRACTING STILL IMAGES

PRIORITY

This application claims priority under 35 U.S.C. § 119(a) to Korean Patent Application No. 10-2015-0082137, which was filed in the Korean Intellectual Property Office on Jun. 10, 2015, the entire disclosure of which is incorporated herein by reference.

BACKGROUND

1. Field of the Disclosure

The present disclosure relates generally to an electronic apparatus and a method for extracting still images by analyzing an input image, and more particularly, to an electronic apparatus and a method for generating a still image from a video file.

2. Description of the Related Art

During high-resolution video capturing, a frame rate may be set to 30 frames per second (FPS), such that video capturing for 1 minute is equivalent to taking 1800 still photos.

While video capturing is theoretically useful for capturing a moment because a user is able to capture fine-scale momentary changes as compared to still-image capturing, functions for capturing video frames and saving the captured video frames as still images must still be developed.

SUMMARY

Accordingly, an aspect of the present disclosure is to provide an electronic apparatus and a method for extracting still images.

According to an aspect of the present disclosure, an electronic device is provided, which includes an image sensor, a display, and a controller configured to generate a video file from an image signal input through the image sensor, assign frame characteristics to each frame included in the video file, selectively display at least one of the frames on the display, receive a selection of a frame among the displayed at least one of the frames, and generate a still image from the selected frame.

According to another aspect of the present disclosure, a method is provided for controlling an electronic device. The method includes generating a video file using an image signal input through an image sensor, assigning frame characteristics to each frame included in the video file, selectively displaying at least one of the frames, receiving a selection of a frame among the displayed at least one of the frames, and generating a still image from the selected frame.

According to another aspect of the present disclosure, an electronic device is provided, which includes an image sensor, a display, and a controller configured to generate a video file from an image signal input through the image sensor, enter a photographing mode for generating a still image from the video file, selectively display at least one of the frames included in the video file on the display, receive a selection of a frame among the displayed at least one of the frames, and generate a still image from the selected frame.

BRIEF DESCRIPTION OF THE DRAWINGS

The above and other aspects, features, and advantages of certain embodiments of the present disclosure will be more apparent from the following detailed description taken in conjunction with the accompanying drawings, in which:

FIG. 10 illustrates a form in which additional information is stored in a video file by using a frame analysis information (FRAI) box configuration, according to an embodiment of the present disclosure;

FIG. 16 illustrates storing of a history of generating a still image in a video file by using a frame capture information (CAPI) box configuration, according to an embodiment of the present disclosure.

DETAILED DESCRIPTION

Figure 1:
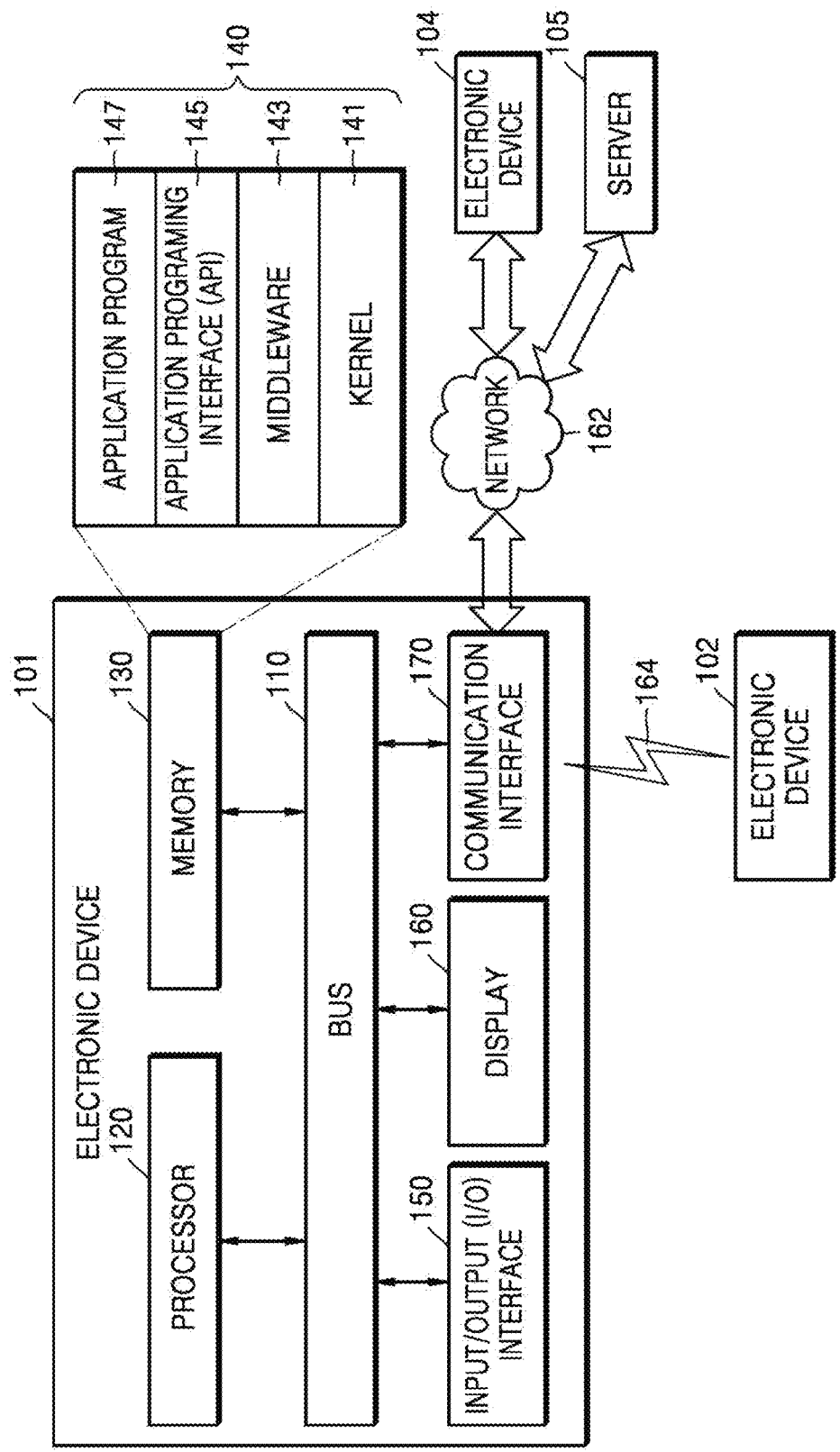
FIG. 1 illustrates an electronic device in a network environment, according to an embodiment of the present disclosure.

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

In the accompanying drawings, like reference numerals may refer to like elements.

Terms defined herein are used for only describing a specific embodiments and are not intended to limit the scope of other embodiments. All terms, including technical and scientific terms, used herein may have the same meanings as would be generally understood by a person of common skill in the art. Terms that are defined in a dictionary have the same or similar meanings as would be understood in the related technology and are not to be interpreted as having ideal or excessively formal meanings unless explicitly defined as such. In some case, terms defined herein cannot be interpreted to exclude the present embodiments.

Herein, a singular form may include a plurality of forms unless explicitly represented as such.

Herein, the term "and/or" includes any and all combinations of one or more of the associated listed items.

Expressions such as "at least one of," when preceding a list of elements, modify the entire list of elements and do not modify the individual elements of the list.

Herein, expressions such as "having," "may have," "comprising," and "may comprise" indicate the existence of a corresponding characteristic (e.g., an element such as a numerical value, function, operation, and/or component) and do not exclude the existence of an additional characteristic.

Herein, expressions such as "A or B," "at least one of A or/and B," and "one or more of A or/and B" may include all possible combinations of together listed items. For example, these expressions may indicate (1) including at least one A, (2) including at least one B, or (3) including both at least one A and at least one B.

Expressions such as "first," "second," "primarily," and "secondary," may represent various elements regardless of order and/or importance, and do not limit corresponding elements. These expressions may be used for distinguishing one element from another element. For example, a first user device and a second user device may represent different user devices, regardless of order or importance. Accordingly, a first element may be referred to as a second element without deviating from the scope of the present embodiments, and similarly, a second element may be referred to as a first element.

When an element (e.g., a first element) is "operatively or communicatively coupled to" or "connected to" another element (e.g., a second element), the first element may be directly connected to the second element or a third element may exist therebetween. However, when the first element is "directly connected to" or "directly coupled to" the second element, no intermediate element exists therebetween.

The expression "configured to (or set to)" may be used interchangeably with, for example, "suitable for," "having the capacity to," "designed to," "adapted to," "made to," or "capable of" according to context. Further, "configured to (or set to)" does not necessarily mean "specifically designed to" by hardware. For example, an "apparatus configured to" may indicate that the apparatus can operate with another apparatus or component.

For example, "a processor configured (or set) to perform A, B, and C" may be a generic-purpose processor (such as a Central Processing Unit (CPU) or an application processor (AP)) that can perform a corresponding operation by executing at least one software program stored at a processor (such as an embedded processor) for performing a corresponding operation or at a memory device.

An electronic device according an embodiment of the present disclosure may be a smart phone, a tablet personal computer (PC), a mobile phone, a video phone, an electronic book (e-book) reader, a desktop PC, a laptop PC, a netbook computer, a workstation, a server, a personal digital assistant (PDA), a portable multimedia player (PMP), an MP3 player, mobile medical equipment, a camera, and a wearable device. For example, the wearable device may include an accessory type device (e.g., a watch, a ring, a bracelet, an anklet, a necklace, glasses, contact lenses, or head-mounted-device (HMD)), a fabric or clothing-integrated type device (e.g., electronic clothing), a body-attached type device (e.g., a skin pad or tattoo), and a body-implanted type device (e.g., an implantable circuit).

The electronic device may also be a smart home appliance, such as a Television (TV), a Digital Video Disk (DVD) player, audio equipment, a refrigerator, an air conditioner, a vacuum cleaner, an oven, a microwave oven, a washing machine, an air cleaner, a set-top box, a home automation control panel, a security control panel, a TV box (e.g., Samsung HomeSync®, Apple TV®, or Google TV®), a game console (e.g., Xbox® or PlayStation®), an electronic dictionary, an electronic key, a camcorder, and an electronic frame.

The electronic device may also include various medical equipment (e.g., various portable medical measurement systems, such as a blood sugar measurement device, a heartbeat measurement device, a blood pressure measurement device, or a body temperature measurement device, a magnetic resonance angiography (MRA) device, a magnetic resonance imaging (MRI) device, a computed tomography (CT) device, an imaging device, or an ultrasonic device), a navigation system, a global navigation satellite system (GNSS), an event data recorder (EDR), a flight data recorder (FDR), a vehicle infotainment device, electronic equipment for ships (e.g., navigation system and gyro compass for ships), avionics, a security device, a vehicle head unit, an industrial or home robot, an automatic teller machine (ATM), a point of sales (POS) device, Internet of Things (IoT) device (e.g., light bulbs, various sensors, electricity or gas meters, sprinkler devices, fire alarm devices, thermostats, streetlights, toasters, exercise machines, hot-water tanks, heaters, boilers, etc.).

The electronic device may also include a part of a furniture or building/structure, an electronic board, an electronic signature receiving device, a projector, and various measuring instruments (e.g., a water, electricity, gas, or electric wave measuring device).

The electronic device may also be a flexible device.

The electronic device may also be a combination of the above-listed devices.

Of course, the electronic device is not limited to the above-listed devices and may include new electronic devices according to new technical developments.

Herein, the term "user" may refer to a person who uses the electronic device or a device (e.g., an artificial intelligence electronic device) using the electronic device.

FIG. 1 illustrates an electronic device in a network environment, according to an embodiment of the present disclosure.

Referring to FIG. 1, the electronic device 101 includes bus 110, a processor 120, a memory 130, an input/output (I/O) interface 150, a display 160, and a communication module 170. Alternatively, the electronic device 101 may omit at least one of the foregoing elements and/or may further include other elements.

The bus 110 may include a circuit for interconnecting the elements 110 through 170 and for allowing communication (e.g., a control message and/or data) between the elements 110 through 170.

The processor 120 may include one or more of a CPU, an AP, and a communication processor (CP). The processor 120 performs operations or data processing for control and/or communication of, for example, at least one other elements of the electronic device 101.

The memory 130 may include a volatile and/or nonvolatile memory. The memory 130 stores software and/or a program 140. The memory 130 may also store, for example, commands or data associated with at least one other elements of the electronic device 101.

The program 140 includes a kernel 141, middleware 143, an application programming interface (API) 145, and an application program (or an application) 147. At least some of the kernel 141, the middleware 143, and the API 145 may be referred to as an operating system (OS).

The I/O interface 150 delivers a command or data input from a user or another external device to other element(s) of the electronic device 101. The I/O interface 150 may also output a command or data received from other element(s) of the electronic device 101 to a user or another external device.

The display 160 may include a liquid crystal display (LCD), a light emitting diode (LED) display, an organic light emitting diode (OLED) display, a microelectromechanical system (MEMS) display, or an electronic paper display. The display 160 may display various contents (e.g., a text, an image, video, an icon, or a symbol) to users. The display 160 may also include a touch screen, which receives a touch, a gesture, proximity, and/or a hovering input, for example, from an electronic pen or a part of a body of a user.

The communication module 170 sets up communication, for example, between the electronic device 101 and a first external electronic device 102, a second external electronic device 104, and/or a server 105. The communication module 170 is connected to a network 162 through wireless or wired communication to communicate with the second external electronic device 104 and/or the server 105.

The wireless communication may use, as a cellular communication protocol, at least one of long term evolution (LTE), LTE-advanced (LTE-A), code division multiple access (CDMA), wideband CDMA (WCDMA), a universal mobile telecommunication system (UMTS), wireless broadband (WiBro), or global system for mobile communications (GSM)). Wireless communication also includes short-range communication 164. The short-range communication 164 may include at least one of wireless fidelity (WiFi), Bluetooth (BT), near field communication (NFC), and global navigation satellite system (GNSS). The GNSS may include at least one of a global positioning system (GPS), a global navigation satellite system (Glonass), a Beidou navigation satellite system (Beidou), and Galileo, the European global satellite-based navigation system. Herein, "GPS" may be used interchangeably with "GNSS".

The wired communication may include at least one of a universal serial bus (USB), a high definition multimedia interface (HDMI), a recommended standard (RS)-2032, and a plain old telephone service (POTS).

The network 162 may include a telecommunications network, for example, at least one of a computer network (e.g., a local area network (LAN) or a wide area network (WAN)), Internet, and a telephone network.

Each of the first external electronic device 102 and the second external electronic device 104 may be the same type or a different type of device than the electronic device 101.

The server 105 may include a group of one or more servers.

All or some of operations performed in the electronic device 101 may be performed in the electronic devices 102 and 104 and/or the server 105. For example, when the electronic device 101 has to perform a function or a service, the electronic device 101 may request the electronic devices 102 and 104, and/or the server 105 to perform at least some functions associated with the function or the service, instead of or in addition to executing the function or the service itself. The electronic devices 102 and 104 and/or the server 105 may perform the requested function or an additional function and deliver the result to the electronic device 101. The electronic device 101 provides the received result or provides the requested function or service by processing the received result. For example, cloud computing, distributed computing, or client-server computing may be used.

Figure 2:
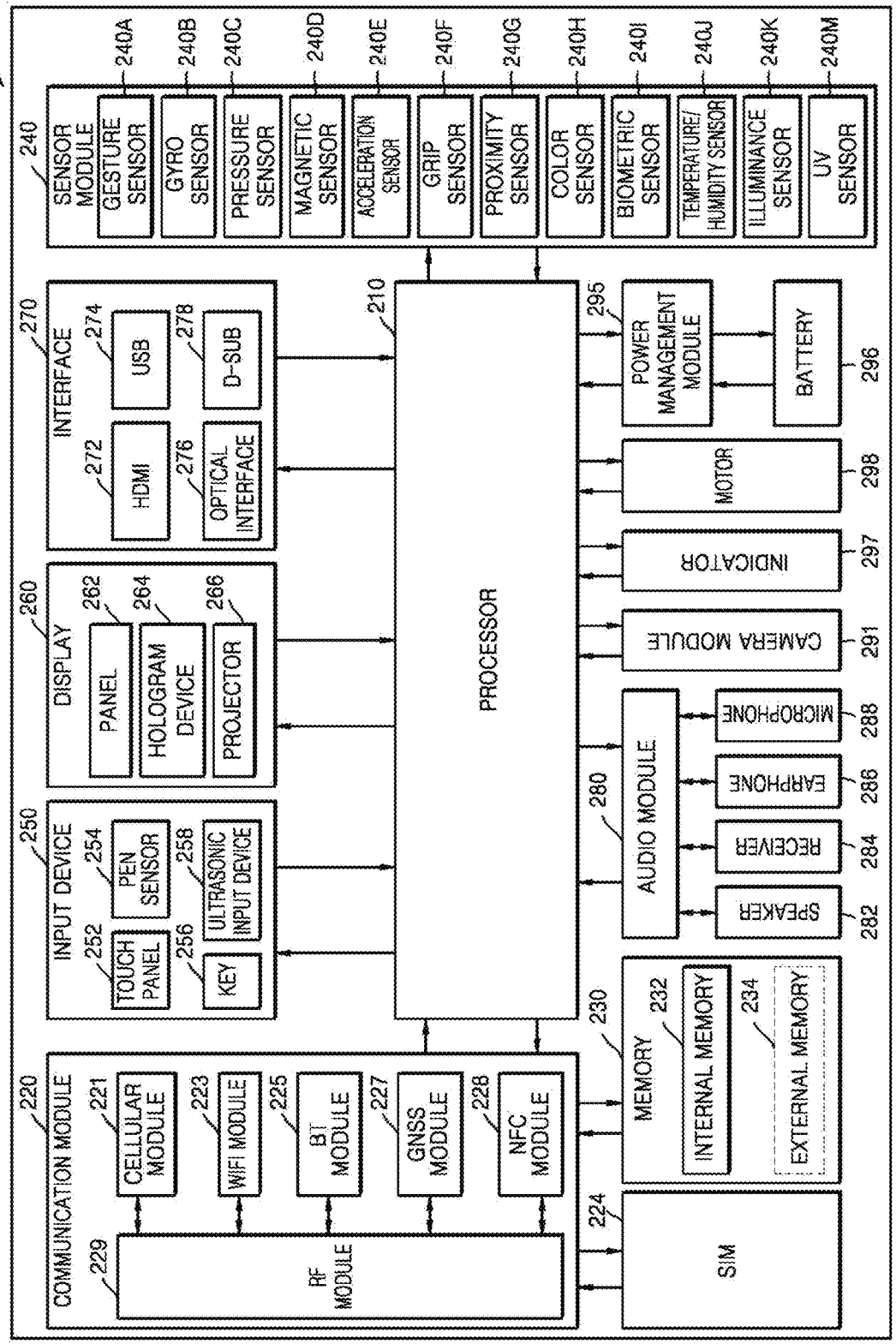
FIG. 2 illustrates an electronic device according to an embodiment of the present disclosure.

FIG. 2 illustrates an electronic device according to an embodiment of the present disclosure.

Referring to FIG. 2, the electronic device 201 includes a processor 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298.

The processor 210 controls multiple hardware or software components connected to the processor 210 by driving an OS or an application program, and performs processing and operations with respect to various data including multimedia data. The processor 210 may be implemented with a system on chip (SoC).

The processor 210 may further include a graphic processing unit (GPU) and/or an image signal processor.

The processor 210 may also include at least some (e.g., a cellular module 221) of the elements illustrated in FIG. 2.

The processor 210 loads a command or data received from at least one of other elements (e.g., a non-volatile memory) into a volatile memory and processes the command or data and stores various data in the non-volatile memory.

The communication module 220 includes the cellular module 221, a WiFi module 223, a BT module 225, a GNSS module (e.g., a GPS module, a Glonass module, Beidou module, or a Galileo module) 227, an NFC module 228, and a radio frequency (RF) module 229.

The memory 230 includes an internal memory 232 or an external memory 234. The internal memory 232 may include at least one of a volatile memory (e.g., dynamic random access memory (DRAM), static RAM (SRAM), synchronous dynamic RAM (SDRAM), and a non-volatile memory (e.g., one time programmable read only memory (OTPROM), programmable ROM (PROM), erasable and programmable ROM (EPROM), electrically erasable and programmable ROM (EEPROM), mask ROM, flash ROM, NAND flash memory, or NOR flash memory), and a solid state drive (SSD).

The external memory 234 may further include a flash drive, a compact flash (CF), a secure digital (SD), a micro-SD, a mini-SD, an extreme Digital (xD), a multimedia card (MMC), or a memory stick. The external memory 234 may be functionally and/or physically connected with the electronic device 1801 through various interfaces.

The sensor module 240 measures physical quantity or senses an operation state of the electronic device 201 to convert the measured or sensed information into an electric signal. The sensor module 240 includes a gesture sensor 240A, a gyro sensor 240B, a pressure sensor 240C, a magnetic sensor 240D, an acceleration sensor 240E, a grip sensor 240F, a proximity sensor 240G, a color sensor 240H (e.g., RGB sensor), a biometric sensor 240I, a temperature/humidity sensor 240J, an illumination sensor 240K, and a ultraviolet (UV) sensor 240M. The sensor module 240 may further include a control circuit for controlling at least one sensor included therein.

Alternatively, the electronic device 201 may also include a processor configured to control the sensor module 240 as part of or separately from the processor 210, to control the sensor module 240 during a sleep state of the processor 210.

The input device 250 includes a touch panel 252, a (digital) pen sensor 254, a key 256, and an ultrasonic input device 258. The touch panel 252 may use at least one of a capacitive type, a resistive type, an infrared (IR) type, or an ultrasonic type. The touch panel 252 may further include a control circuit. The touch panel 252 may further include a tactile layer to provide tactile reaction to the user.

The (digital) pen sensor 254 may include a recognition sheet which is a part of the touch panel 252 or a separate recognition sheet.

The key 256 may also include a physical button, an optical key, or a keypad.

The ultrasonic input device 258 senses ultrasonic waves generated in an input means for generating the ultrasonic waves through a microphone 288 and checks data corresponding to the sensed ultrasonic waves in the electronic device 201.

The display 260 includes a panel 262, a hologram device 264, and a projector 266. The panel 262 may be implemented to be flexible, transparent, and/or wearable. The panel 262 may be configured with the touch panel 252 in one module.

The interface 270 includes a high-definition multimedia interface (HDMI) 272, a universal serial bus (USB) 274, an optical communication 276, and a D-subminiature 278.

The audio module 280 bi-directionally converts sound and an electric signal. The audio module 280 processes sound information input or output through the speaker 282, the receiver 284, the earphone 286, and/or the microphone 288.

The camera module 291 captures a still image or a moving image, and may include one or more image sensors (e.g., a front sensor or a rear sensor), a lens, an image signal processor (ISP), or a flash (e.g., an LED or a xenon lamp).

The power management module 295 manages power of the electronic device 201. The power management module 295 may include a Power management integrated circuit (PMIC), a charger IC, and/or a battery gauge. The PMIC may have a wired and/or wireless charging scheme. The battery gauge measures the remaining capacity of the battery 296 or the voltage, current, or temperature of the battery 296 during charging.

The indicator 297 displays a particular state, for example, a booting state, a message state, or a charging state, of the electronic device 201 or a part thereof (e.g., the processor 210).

The motor 298 converts an electric signal into mechanical vibration or generates vibration or a haptic effect.

Each of the foregoing elements described herein may include one or more components, and a name of the part may vary with a type of the electronic device 201.

Alternatively, the electronic device 201 may include at least one of the foregoing elements, and some of the elements may be omitted therefrom or other elements may be further included therein. As some of the elements of the electronic device 201 are coupled into one entity, the same function as those of the elements that have not been coupled may be performed.

Figure 3:
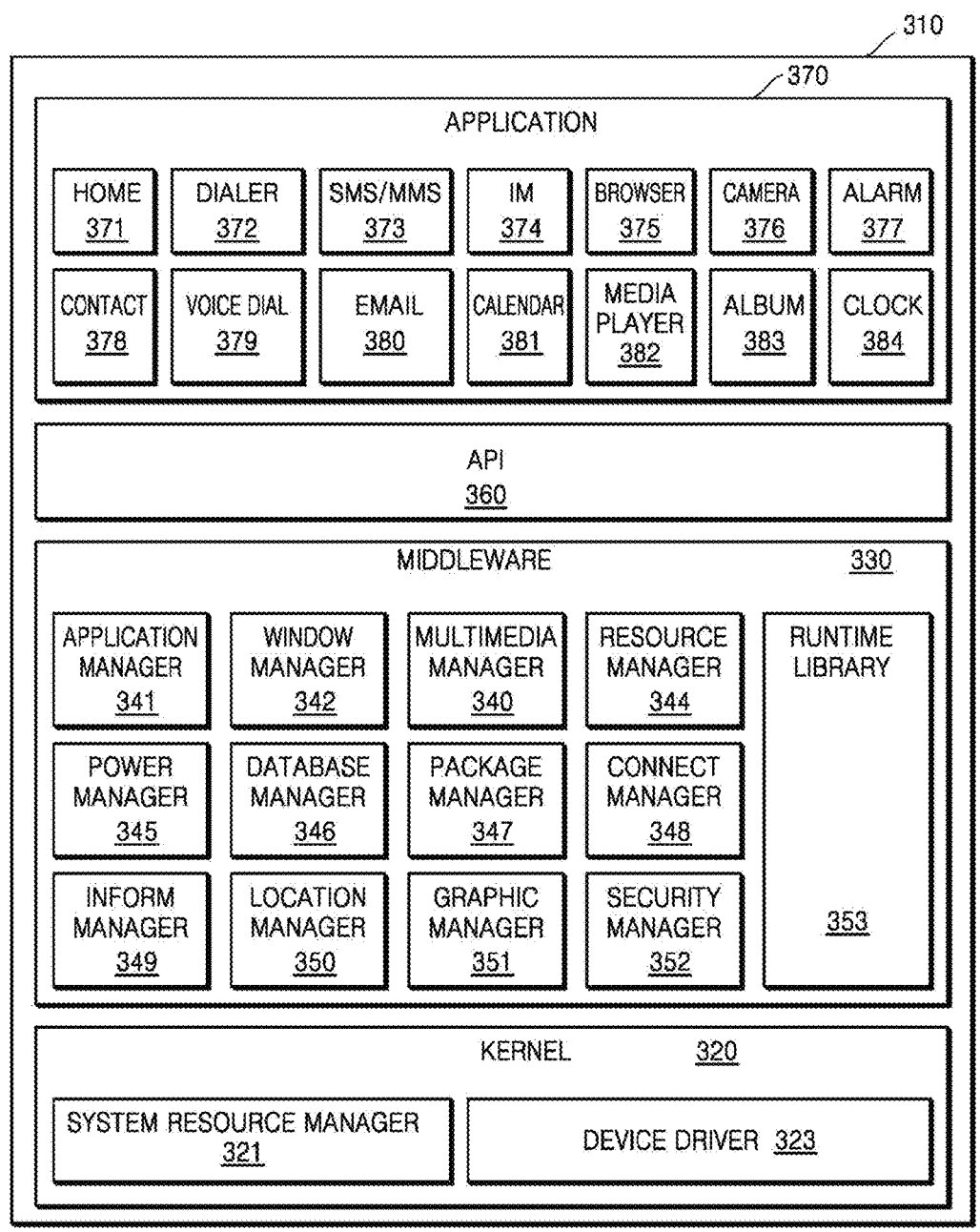
FIG. 3 illustrates a programming module according to an embodiment of the present disclosure.

FIG. 3 illustrates a programming module according to an embodiment of the present disclosure.

Referring to FIG. 3, the programming module 310, which may be substituted for the program 140 in FIG. 1, may include an OS for controlling resources associated with an electronic device and/or various applications executed on the OS. The OS may include Android®, iOS®, Windows®, Symbian®, Tizen®, or Bada.

The programming module 310 includes a kernel 320, a middleware 330, an application programming interface (API) 360, and applications 370. At least a part of the programming module 310 may be preloaded on an electronic device or may be downloaded from an external electronic device.

The kernel 320 includes a system resource manager 321 and/or a device driver 323.

The system resource manager 321 may perform control, allocation, or retrieval of system resources. The system resource manager 321 may include a process management unit, a memory management unit, or a file system. The device driver 323 may include a display driver, a camera driver, a Bluetooth driver, a shared memory driver, a USB driver, a keypad driver, a WiFi driver, an audio driver, and/or an inter-process communication (IPC) driver.

The middleware 330 may include provide functions that the applications 370 commonly require or provide various functions to the applications 370 through the API 360 to allow the applications 370 to efficiently use a limited system resource in an electronic device. The middleware 330 includes a runtime library 353, an application manager 341, a window manager 342, a multimedia manager 343, a resource manager 344, a power manager 345, a database manager 346, a package manager 347, a connectivity (or connect) manager 348, a notification (or inform) manager 349, a location manager 350, a graphic manager 351, and a security manager 352.

The middleware 330 may also include a middleware module forming a combination of various functions of the above-mentioned internal elements. The middleware 330 may provide modules specified according to types of OS so as to provide distinctive functions. Additionally, the middleware 330 may delete some of existing elements or add new elements dynamically.

The API 360 may be provided as a set of API programming functions with a different configuration according to the OS. In the case of Android® or iOS®, for example, one API set may be provided by each platform, and in the case of Tizen®, two or more API sets may be provided.

The applications 370 include a home application 371, a dialer application 372, a short messaging service/multimedia messaging service (SMS/MMS) application 373, an instant message (IM) application 374, a browser application 375, a camera application 376, an alarm application 377, a contact application 378, a voice dial application 379, an e-mail application 380, a calendar application 381, a media player application 382, an album application 383, and a clock application 384. The applications 370 may include other applications, e.g., a health care application (e.g., an application for measuring an exercise amount or a blood sugar level), or an environment information providing application (e.g., an application for providing air pressure, humidity, or temperature information).

At least a part of the programming module 310 may be implemented by software, firmware, hardware, or a combination of at least two of them. The at least a part of the programming module 310 may be implemented (e.g., executed) by a processor. The at least a part of the programming module 310 may include a module, a program, a routine, sets of instructions, or a process for performing one or more functions.

At least a part of a device (for example, modules or functions thereof) or a method (for example, operations) according to various embodiments may be implemented with a command stored in a computer-readable storage medium in the form of a program module. When the command is executed by a processor, the one or more processors may perform a function corresponding to the command. The computer-readable storage medium may be, for example, a memory.

Modules or programming modules according to various embodiments may include one or more of the foregoing elements, have some of the foregoing elements omitted, or further include additional other elements. Operations performed by the modules, the programming modules or other elements may be executed in a sequential, parallel, repetitive or heuristic manner. Also, some of the operations may be executed in different order or omitted, or may have additional different operations.

Figure 4:
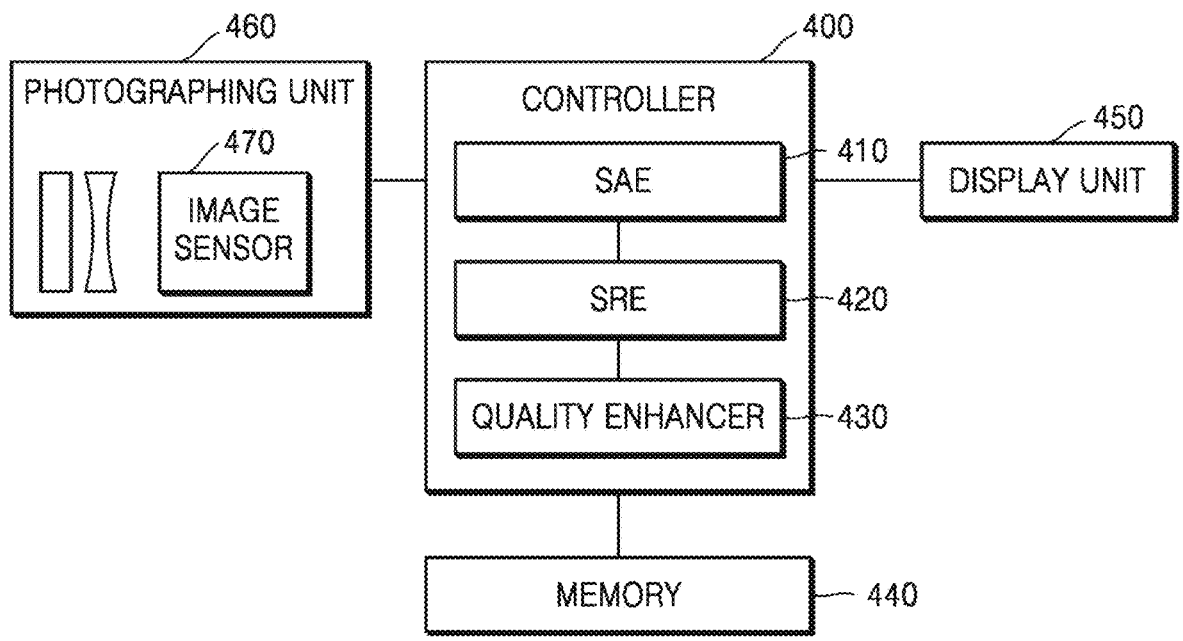
FIG. 4 illustrates an electronic device according to an embodiment of the present disclosure.

FIG. 4 illustrates an electronic device according to an embodiment of the present disclosure.

Referring to FIG. 4, the electronic device includes a controller 400, a memory 440, a display unit 450, and a photographing unit 460.

In operation, light input through a lens provided in the photographing unit 460 is converted into an image signal by an image sensor 470. The controller 400 generates a video file by using the image signal. A frame characteristic analyzer or SAE 410 included in the controller 400 analyzes characteristics of each frame included in the generated video and stores score data corresponding to the analysis in the frame. Herein, the score data refers to data that scores analyzed characteristics of each frame based on certain criteria.

A frame recommender or SRE 420 selects a frame by using the analysis result of the SAE 410. The controller 400 displays the selected frame on the display unit 450.

The memory 440 stores reference data used by the SAE 410 to analyze a video file or reference data used by the SRE 420 to select a frame.

The SAE 410, the SRE 420, and a quality enhancer 430 may exist as separate modules in the controller 400 or may be implemented by a program and included in the controller 400.

Figure 5:
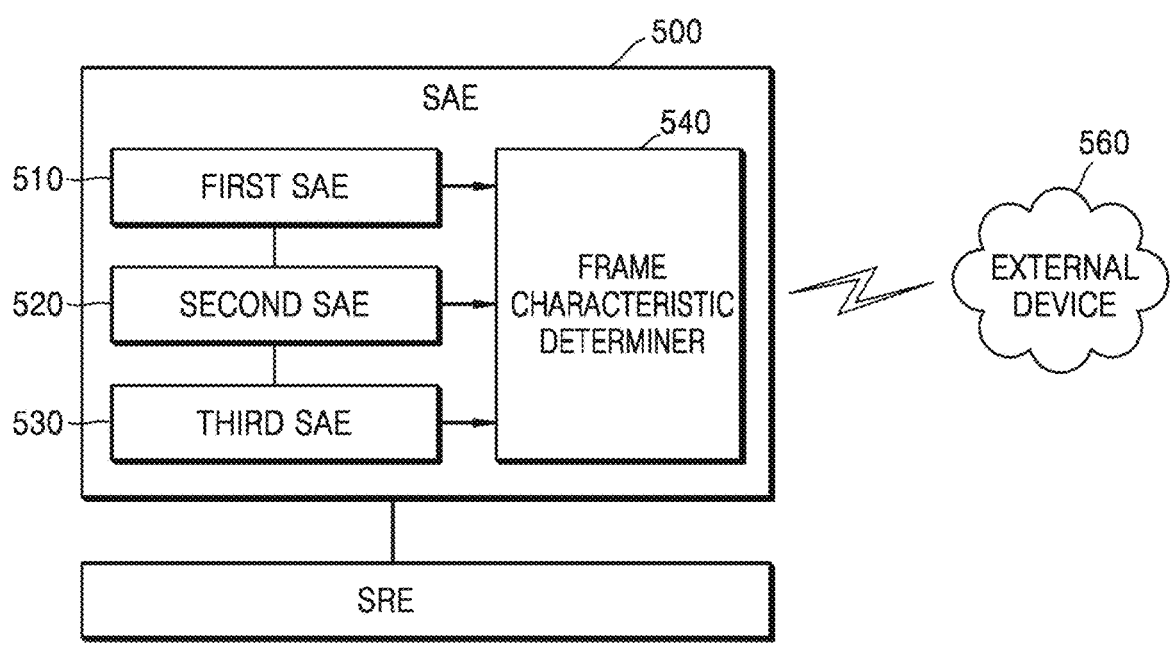
FIG. 5 illustrates a scene analysis engine (SAE) and a scene recommendation engine (SRE), according to an embodiment of the present disclosure.

FIG. 5 illustrates an SAE and an SRE according to an embodiment of the present disclosure.

Referring to FIG. 5, the SAE 500 includes a first SAE 510, a second SAE 520, and a third SAE 530 that respectively process different types of data. The SAE 500 includes a frame characteristic determiner 540 that collects multiple data received from the first SAE 510, the second SAE 520, and the third SAE 530 and selects specific data.

For example, if the amount of data to be analyzed is small, the SAE 500 may analyze information by using an input frame through the first SAE 510 and assign score data to the information. However, if the amount of data to be analyzed is large, the SAE 500 analyzes information by using an input frame through the second SAE 520 after completion of video capturing. Alternatively, the third SAE 530 may transmit information extracted from an input frame to an external device 560 or a remote terminal. The external device 560 or the remote terminal analyzes the receive data and transmits an analysis result to the third SAE 530. The external device 560 may be connected with an electronic device over a specific network, and may be a cloud device.

The frame characteristic determiner 540 determines a final score by using the analyzed data or the stored information and assigns score data to each frame.

Figure 6:
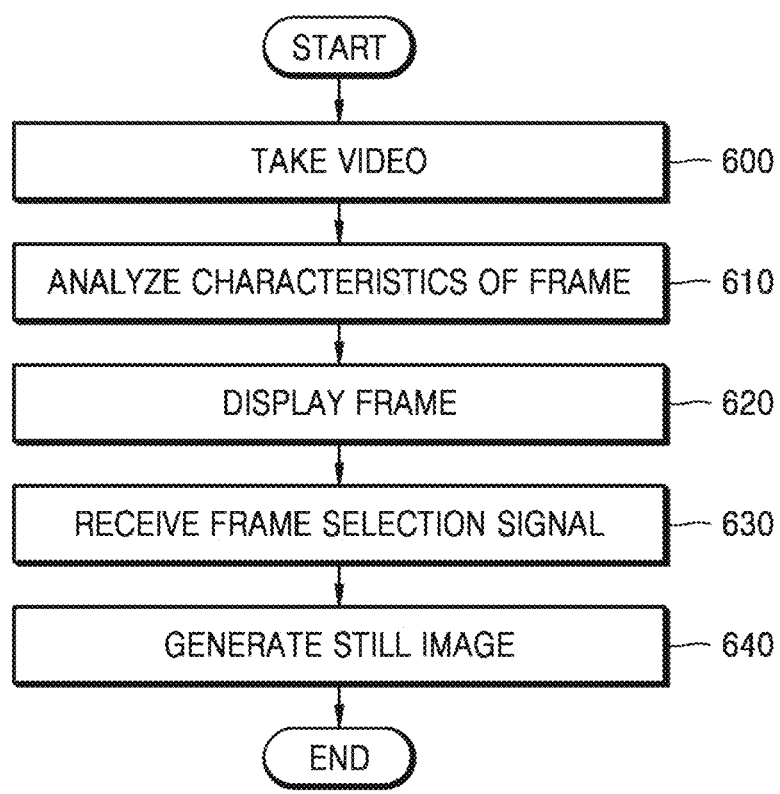
FIG. 6 is a flowchart illustrating a method of controlling an electronic device, according to an embodiment of the present disclosure.

FIG. 6 is a flowchart illustrating a method of controlling an electronic device according to an embodiment of the present disclosure. For example, the method of FIG. 6 will be described below as being performed by the electronic device illustrated in FIG. 4.

Referring to FIG. 6, in step 600, the electronic device takes a video. For example, taking a video is performed in the same way as in general camera shooting, wherein a user may set an iris value, sensitivity, a shutter speed, and so forth before starting photographing. Accordingly, an image signal input through the image sensor 470 is compressed and stored in the form of a video frame by the controller 400.

In step 610, the electronic device analyzes characteristics of a video frame. For example, the SAE 410 converts and compresses the image signal into a video file, and stores additional information together in a video frame. The additional information may include information available for image analysis and result information corresponding to an analysis result. For example, the additional information may include exchangeable image file format (Exif) information, such as color, exposure, sensitivity, shutter speed, etc., object recognition information including face detection, object recognition information including face recognition, and inter-frame motion analysis information. This information is analyzed and stored in the form of score data by the SAE 410. The score data is stored for each frame of a video file.

Because the taken video is to be used for extraction of a still image frame after video taking, rather than for smooth playback like in a general video, parameters may be set to minimize an influence of a shake. For example, if a shutter speed is set to about $\frac{1}{30}$ second for general video capturing, the shutter speed may be set to about $\frac{1}{60}$ second, $\frac{1}{125}$ second, $\frac{1}{250}$ second, etc., when video capturing according to the method of FIG. 6. Thus, the electronic device may generate a video file having a less shake than in an existing video file, such that a still image frame extracted from such a video file may also include a less shake and may be clearer than the existing video file.

In step 610, the SAE 410 may analyze the additional information in various ways.

In step 620, the controller 400 selectively displays frames on the display unit 450 based on the score data assigned to each frame. For example, the controller 400 may display all frames to which score data is assigned or may selectively display some of the frames on the display unit 450.

In step 630, the controller 400 determines whether there is a frame in which a frame selection signal is input among the frames displayed on the display unit 450. For example, the electronic device may receive a frame selection signal through touch input if the display unit 450 is implemented with a touch screen or may receive a frame selection signal through a separate physical key if the display unit 450 is not implemented with a touch screen.

In step 640, the controller 400 generates a still image file for the selected frame. An image captured by the photographing unit 460 may be stored using a video codec, while the selected frame may be stored in the same form as a general still image.

FIGS. 7A through 9D illustrate various methods of analyzing information through the SAE 410 according to an embodiment.

Figure 7A:
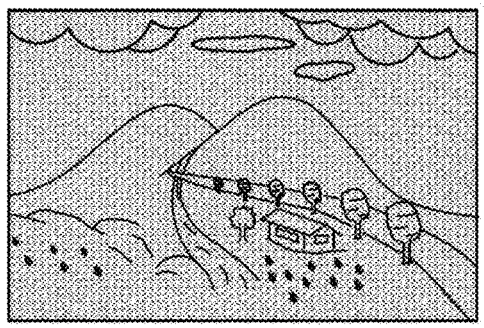
FIG. 7A illustrates a frame having a low brightness value, according to an embodiment of the present disclosure.
Figure 7B:
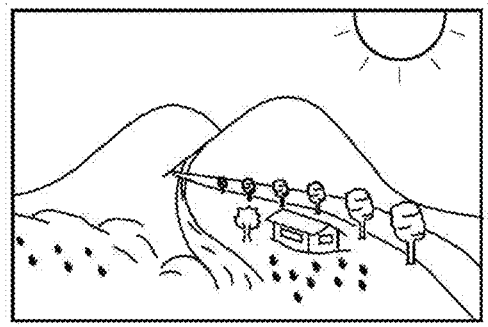
FIG. 7B illustrates a frame having an increased brightness value, according to an embodiment of the present disclosure.
Figure 7C:
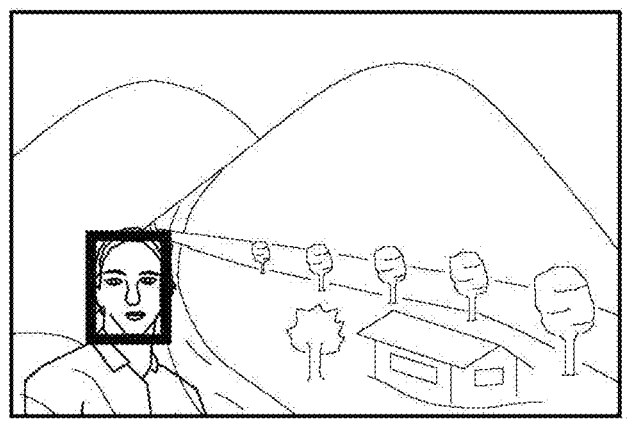
FIG. 7C illustrates a frame including a specific person that is selected as a main frame, according to an embodiment of the present disclosure.

Specifically, FIG. 7A illustrates a frame having a low brightness value, FIG. 7B illustrates a frame having an increased brightness value, and FIG. 7C illustrates a frame including a specific person that is selected as a main frame, according to an embodiment of the present disclosure.

Figure 8A:
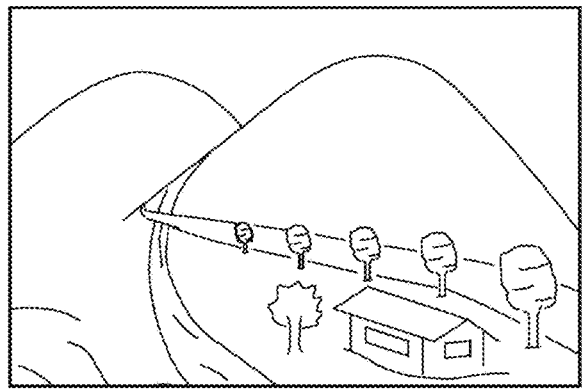
FIG. 8A illustrates a frame including a landscape in which no human appears, according to an embodiment of the present disclosure.
Figure 8B:
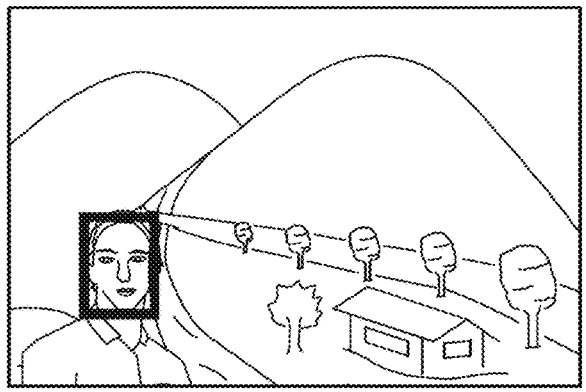
FIG. 8B illustrates a frame including a person, according to an embodiment of the present disclosure.
Figure 8C:
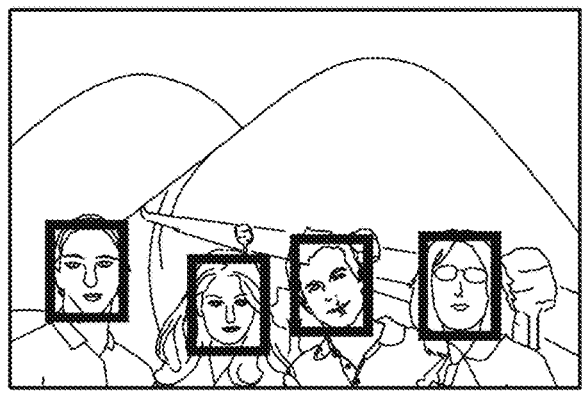
FIG. 8C illustrates a frame including multiple people according to an embodiment of the present disclosure.
Figure 8D:
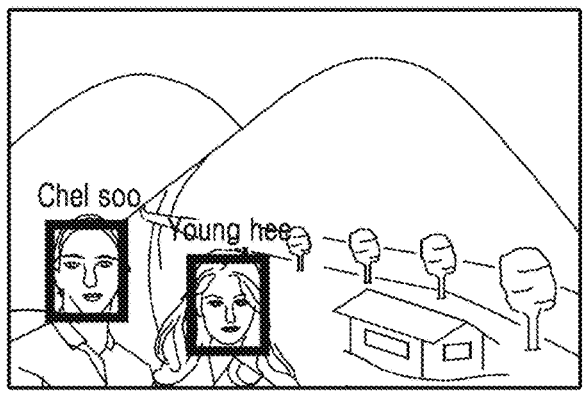
FIG. 8D illustrates a frame in which a person is recognized, according to an embodiment of the present disclosure.

FIG. 8A illustrates a frame including a landscape in which no human appears, FIG. 8B illustrates a frame including a person, FIG. 8C illustrates a frame including multiple people, and FIG. 8D illustrates a frame in which a person is recognized, according to an embodiment of the present disclosure.

Figure 9A:
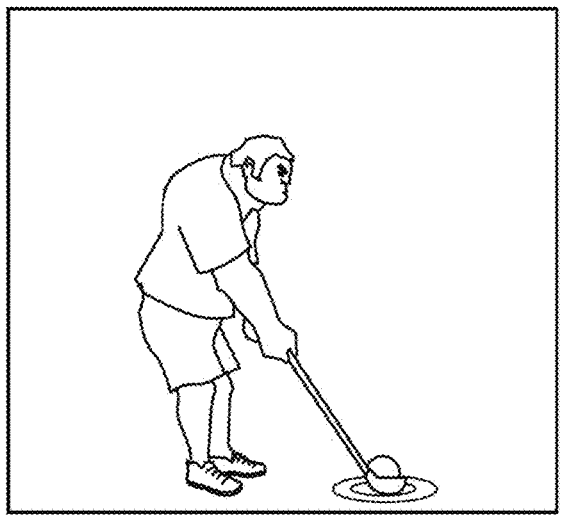
FIG. 9A illustrates a frame in which a main object does not move, according to an embodiment of the present disclosure.
Figure 9B:
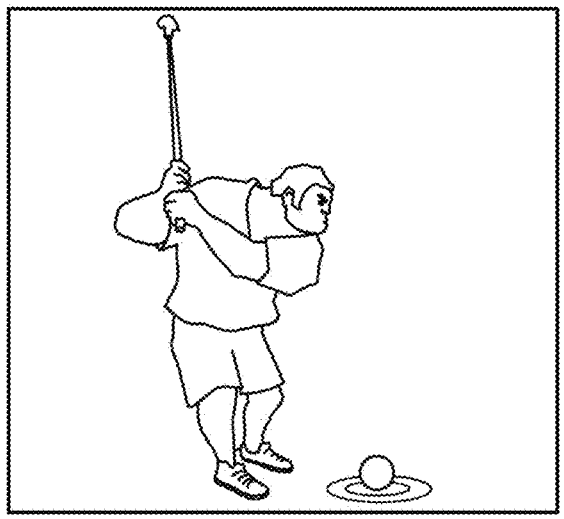
FIG. 9B illustrates a frame in which a main object moves, according to an embodiment of the present disclosure.
Figure 9C:
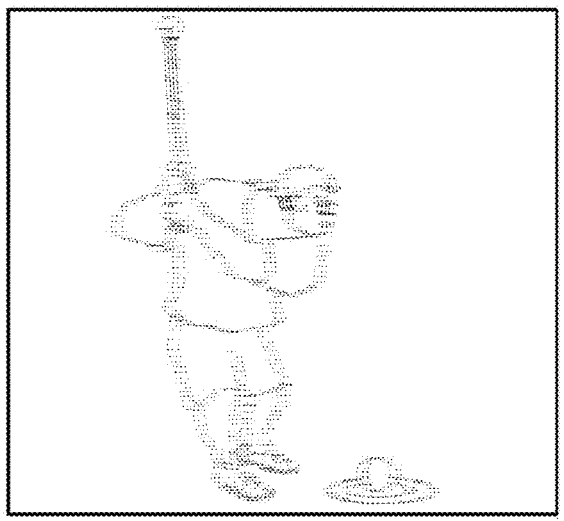
FIG. 9C illustrates a frame in which a main object is focused, according to an embodiment of the present disclosure.
Figure 9D:
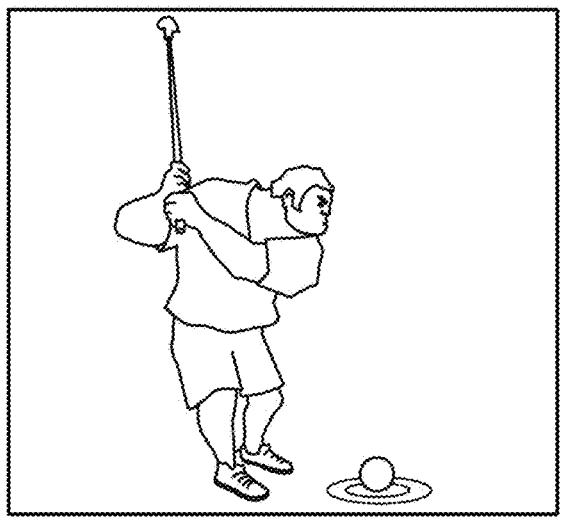
FIG. 9D illustrates a frame in which a main object is focused, according to an embodiment of the present disclosure.

FIG. 9A illustrates a frame in which a main object does not move, FIG. 9B illustrates a frame in which a main object moves, FIG. 9C illustrates a frame in which a main object is focused, and FIG. 9D illustrates a frame in which a main object is focused, according to an embodiment of the present disclosure.

In accordance with an embodiment of the present disclosure, the SAE 410 analyzes scene sensitivity by statistically analyzing an entire area of the input frame in order to measure a color change or a brightness change. Because the scene sensitivity analysis is not based on a meaning included in each object, image information is directly analyzed statistically without an additional algorithm. Thus, the scene sensitivity analysis may be computed within a short time.

For example, the SAE 410 may calculate a color histogram value or a brightness histogram value from pixel to pixel or from set pixel range to set pixel range for each input frame. The SAE 410 compares the calculated color histogram or brightness histogram value frame-by-frame to obtain sensitivity. As a difference in a color histogram value or a brightness histogram value between a previous frame and a following frame increases, a sensitivity increases. Thus, scene sensitivity analysis may set a high importance for a scene having a large change, rather than a continuing similar scene. The scene sensitivity analysis increases an importance for situations in which the amount of change or a variation in a specific frame abruptly increases or decreases, when compared to an overall variation in frames input for a specific period.

During the scene sensitivity analysis, if the SAE 410 collectively analyzes a variation for the entire screen, the SAE 410 obtains a sensitive analysis result for the entire screen, but the SAE 410 may not be relatively sensitive to a partial change. For example, when a particular object moves horizontally in a fixed scene, a frame including a scene in which the object enters the screen and a frame including a scene in which the object disappears from the screen have high importance and a frame including a scene in which the object moves within the screen may have a low importance. To compensate for this issue, the SAE 410 may divide the screen into regions to perform statistical analysis with respect to each region, and predict an analysis result with respect to the entire screen from a combination of analysis results.

For example, FIGS. 7A and 7B illustrate image frames in which a brightness histogram value changes by a large amount.

In a frame input at time t, as illustrated in FIG. 7A, an image is globally dark because clouds cover the sky. However, in a frame input at time (t+1), as illustrated in FIG. 7B, a brightness of the image is higher than the frame input at t. In view of a user, a user sensitivity of the frame at (t+1) increases largely. The SAE 410 compares the frame at t with the frame at (t+1), recognizes that the brightness histogram value of the frame at (t+1) changes significantly, and assigns high score data related to the brightness histogram to the frame at (t+1).

Alternatively, the SAE 410 analyzes additional information by using an object detection algorithm including face detection or an object recognition algorithm using face recognition in a region of interest (ROI) of an input frame. The SAE 410 recognizes a face, a specific human figure, and an object having a larger size than a set threshold size by using the algorithm to calculate score data and to analyze an importance of a frame.

For example, as illustrated in FIG. 7C, a frame including a specific person may be selected as a main frame, or a frame in which a size of a face increases at a preset ratio with respect to the screen or more or in which a main person is positioned in the center of the screen may be selected as a main frame.

FIGS. 8A and 8B illustrate frame importance analysis based on face detection according to an embodiment of the present disclosure.

In a frame input at time t, as illustrated in FIG. 8A, no face is detected. In a frame input at time (t+1), as illustrated in FIG. 8B, a face is detected. The SAE 410 compares a previous frame with a following frame to identify a frame in which a face is newly detected and assigns high score data to the face-detected frame.

Similarly, the SAE 410 may assign high score data when the number of faces changes in a newly input frame.

FIG. 8C illustrates four faces being detected at time (t+2). In this case, the SAE 410 may assign higher score data to a frame including multiple faces than a frame including a single face. Alternatively, the SAE 410 may assign higher score data to a frame including a single face than a frame including multiple faces.

As another example, the SAE 410 may assign high score data to a frame in which a face is recognized. The SAE 410 compares the detected face with a face information database (DB) previously stored in the memory 440 of the electronic device. If the detected face corresponds to a face stored in the DB, the SAE 410 assigns high score data to the frame in which the corresponding face appears.

FIG. 8D illustrates a face being recognized.

Referring to FIG. 8D, the SAE 410 compares a face detected in a frame input at time (t+3) with the face information DB previously stored in the memory 440 of the electronic device. If the detected face corresponds to a face in the face information DB, the electronic device displays information, extracted from the DB, near the input face. For example, if a name of the face is in the DB, the controller 400 displays the name near the detected face as illustrated in FIG. 8D and the SAE 410 assigns high score data to the frame and stores the high score data.

Alternatively, the SAE 410 may assign score data to a frame by using a result of analyzing motion in an ROI of the input frame. That is, for face detection and recognition, detection and recognition are main analysis targets. Thus, a frame in which a face appears or is recognized may be a main frame.

Alternatively, a frame in which a detected face moves in a screen may be selected as a main frame. For example, a frame in which motion of a main object in a central portion of the screen is different from motion of the main object in a peripheral portion of the screen may be selected as a main frame and score data is assigned to the frame.

FIGS. 9A and 9B illustrate analysis of motion and assignment of score data to a frame according to an embodiment of the present disclosure.

Referring to FIG. 9A, a golfer waits to play a shot at time t. For example at time t, a slight motion of the golfer does not exceed a threshold value.

In FIG. 9B, the golfer swings at time (t+1). For example, as the golfer rotates a golf club to get ready to swing, the SAE 410 compares the frame at time t with the frame at time (t+1), obtains an analysis result indicating that the frame at (t+1) includes more motion, and assigns high score data to the frame at (t+1).

In accordance with another embodiment of the present disclosure, the SAE 410 may assign low score data to a frame having a low auto focus (AF) result value. Thus, the SAE 410 may select a frame taken without a shake.

The SAE 410 may derive a contrast value with respect to an input frame. If the derived contrast value is less than or equal to a threshold value, the SAE 410 assigns low score data to the frame. The SAE 410 may assign high score data to a frame corresponding to a derived contrast value exceeding the threshold value. As such, frames having clear display qualities may be selected.

FIGS. 9C and 9D illustrate assignment of score data to a frame by using distribution of a high-frequency component within a scene.

Referring to FIG. 9C, a frame in which the golfer swings the golf club is displayed with a shake, i.e., is blurry.

In FIG. 9D, a frame in which the golfer swings the golf club is displayed with no shake, i.e., is clear.

Accordingly, the SAE 410 assigns low score data to the frame including a shake in FIG. 9C, and assigns high score data to the frame including no shake in FIG. 9D. Thus, frames having a less shake may be selected.

The frames displayed on the display unit 450 may be displayed after an image signal input through the image sensor 470 is converted in a YUV format. A process of converting a frame displayed in the YUV format into a still image format may use a generally known method. The still image generated in this case includes Exif information like a still image generated by general still image capturing.

The SAE 410 may store score data analyzed by the SAE 410 and photographing information that may be additionally analyzed later as metadata in a video file. For example, the SAE 410 stores the metadata of the video file as shown in Table 1 by using an FRAI box tag.

TABLE 1

| Field | Field Size | Field Value |
| --- | --- | --- |
| | FRAI Box Configuration | |
| Size | 4 Bytes | Size of FRAI box |
| Type | 4 Bytes | "frai" |
| Version | 4 Bytes | Version information of type |
| FrameCount | 4 Bytes (defined in size) | Number of analysis information recorded in FRAI box |
| Analysis Information | n Bytes | Collection of frame-specific analysis information provided in photographing stage |

For example, FRAI is stored in a user data box udta box of an MP4 file. In Table 1, 'Size' indicates a total capacity occupied by FRAI box, 'Type' indicates that details of current FRAI appears in the user data box, 'Version' indicates a version of current FRAI box, 'FrameCount' indicates the number of analysis information recorded in actual FRAI box, and 'Analysis Information' includes various information obtained during video capturing or analysis information obtained through analysis of each frame by the SAE 410.

Figure 10:
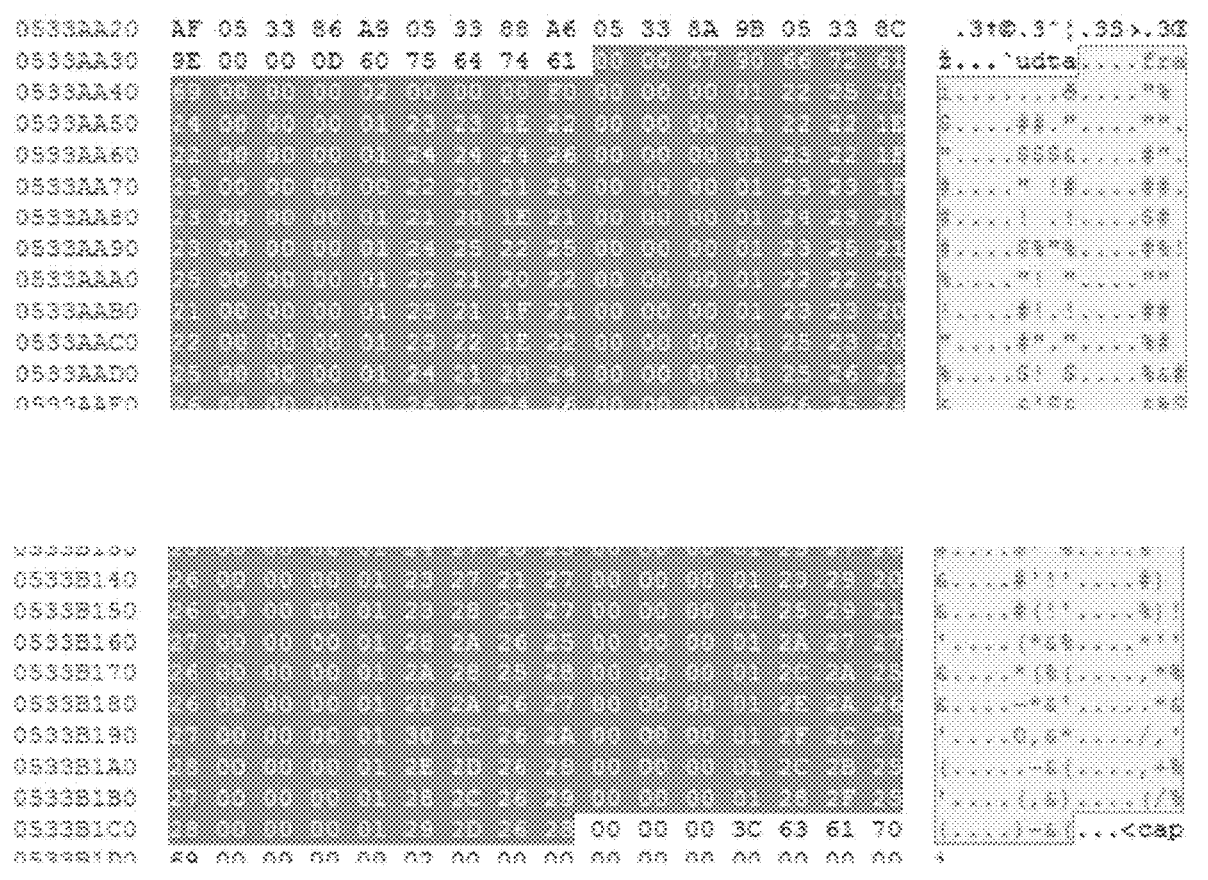

FIG. 10 illustrates a form in which additional information is stored in a video file by using an FRAI box configuration according to an embodiment of the present disclosure.

Figure 11:
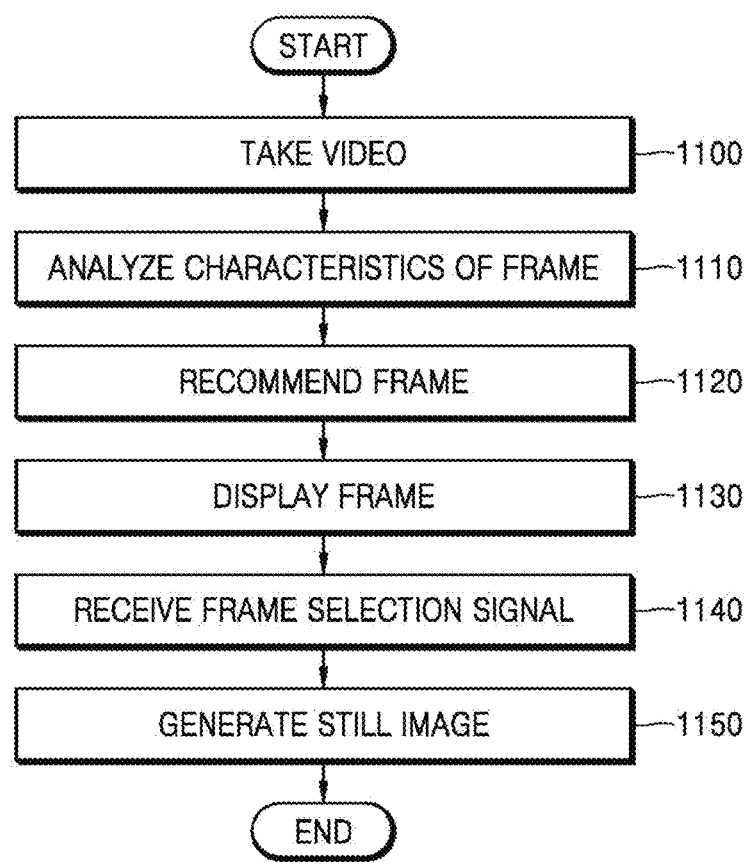
FIG. 11 is a flowchart illustrating a method of controlling an electronic device including an SRE, according to an embodiment of the present disclosure.

FIG. 11 is a flowchart illustrating a method of controlling an electronic device including an SRE, according to an embodiment of the present disclosure. Specifically, FIG. 11 illustrates a process of determining priority by using analysis performed by the SAE 410 and derived score data and selectively displaying a frame. For example, the method of FIG. 11 will be described below as being performed by the electronic device illustrated in FIG. 4.

Referring to FIG. 11, a video is taken by the electronic device in step 1100, i.e., the controller 400 converts and compresses an image signal into a video file.

In step 1110, the electronic device analyzes characteristics of the frames of the video, i.e., the SAE 410 stores additional information and score data for each frame in the same manner as described above.

In step 1120, the electronic device recommends a frame. For example, the SRE 420 selects priorities among frames by using score data and additional information stored for each frame to select a frame regarded as being meaningful to a user.

In step 1130, the electronic device displays the selected frame. For example, the controller 400 or the SRE 420 displays the selected frame on the display unit 450. The number of displayed images may be set by the user. The SRE 420 may also actively determine the number of displayed images based on characteristics of the taken video.

The SRE 420 may be positioned inside the electronic device, but if the electronic device is connected with the external device 560 or a server over a network, the SRE 420 may deliver data from the SAE 410 to the external device 560 or a terminal and receive an analysis result.

The controller 400 may analyze a currently input scene to identify a scene. For example, the controller 400 may analyze an input scene as a portrait scene, a night scene, a sports scene, a landscape scene, etc. If the controller 400 determines the currently input scene as a portrait scene, the SRE 420 may select a frame having high score data related to face detection or face recognition from among score data-assigned frames received from the SAE 410.

If the controller 400 determines the currently input scene as a landscape scene, the SRE 420 may select a frame having high score data related to a color histogram or a brightness histogram from among the score data-assigned frames received from the SAE 410.

If the controller 400 determines the currently input scene as a sports scene, the SRE 420 may select a frame having high score data related to motion detection from among the score data-assigned frames received from the SAE 410.

Alternatively, the SRE 420 may select a frame by using an analysis method selected by the user from among analysis methods for a change in a color histogram or a brightness histogram, face recognition and identification, a motion detection result, etc.

In step 1140, the controller 400 identifies a frame in which a frame selection signal is input from among displayed frames.

In step 1150, the electronic device generates a still image file for the selected frame in the same manner as described above.

Figure 12:
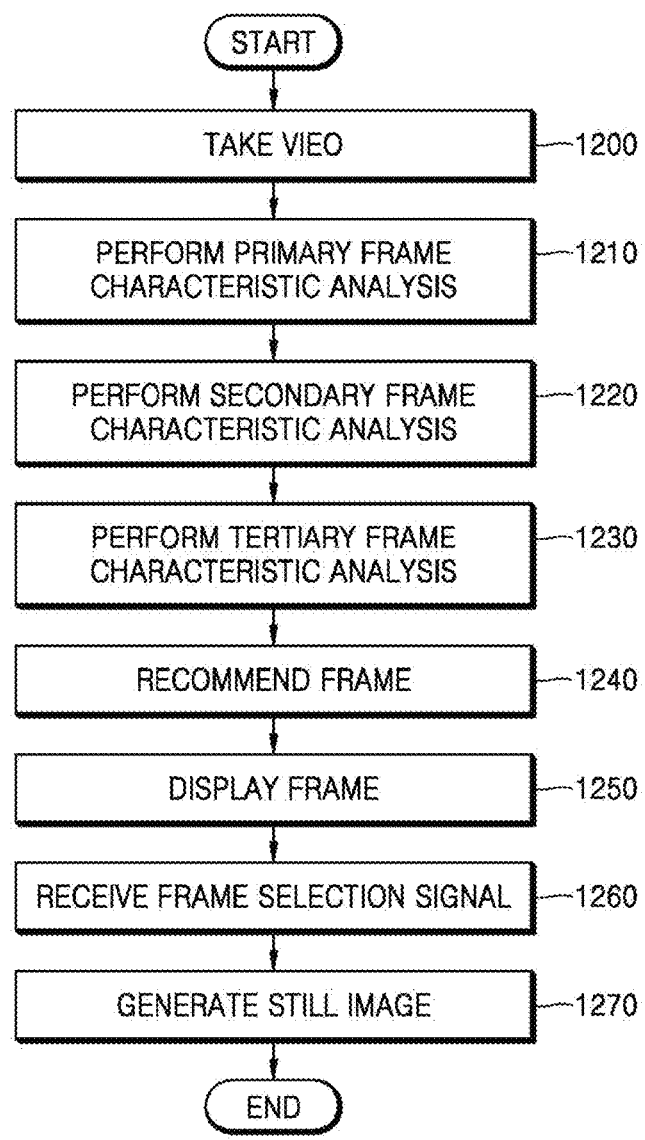
FIG. 12 is a flowchart illustrating a method of controlling an electronic device including multiple SAEs, according to an embodiment of the present disclosure.

FIG. 12 is a flowchart illustrating a method of controlling an electronic device including multiple SAEs, according to an embodiment of the present disclosure. For example, FIG. 12 illustrates analysis of additional information by using the multiple SAEs 510, 520, and 530 of FIG. 5.

Referring to FIG. 12, in step 1200, the electronic device takes a video. If the electronic device processes frame analysis in real time, the electronic device may lower analysis precision for rapid frame interpretation and result derivation. Thus, for primary analysis, the electronic device may reduce data to be processed or simplify an algorithm to be used.

For example, in step 1210, the first SAE 510 may analyze a color histogram or a brightness histogram between frames in a statistical manner and assign score data to each frame.

Information that is difficult to analyze in real time may be subject to secondary analysis. The second SAE 520 may be performed prior to video playback after completion of video capturing.

For example, in step 1220, the second SAE 520 assigns score data to an input frame by using a result of analyzing motion in an ROI of the frame. Analysis of motion in the ROI of the input frame may maintain higher accuracy when the analysis is performed based on information of the entire image without reducing data of the input frame.

Information that is difficult to analyze by a single electronic device may be subject to tertiary analysis. The third SAE 530 may perform analysis by communicating with the external device 560 or a server over a network.

For example, in step 1230, the third SAE 530 may include object recognition including face recognition.

Object recognition including face recognition may have higher recognition accuracy for a larger amount of data to be compared. Thus, the third SAE 530 transmits face information or object information input during video capturing to the server of the external device 560 over a network. The external device 560 compares the received face information or object information with a DB and transmits a comparison result back to the third SAE 530.

Data analyzed in the first SAE 510, the second SAE 520, and the third SAE 530 may be integrated into single data and assigned to each frame as score data.

In step 1240, the electronic device recommends a frame. For example, the SRE selects priorities between frames by using the score data assigned to each frame.

In step 1250, the electronic device selectively displays the frames.

In step 1260, the electronic device identifies a frame in which a frame selection signal is input from among the displayed frames.

In step 1270, the electronic device generates the selected frame as a still image as described above.

By using the foregoing analysis method, the electronic device recommends a frame meaningful to a user. That is, the user may check only frames recommended by the electronic device, without having to check all frames, after completion of video capturing.

Generally, if the electronic device takes a one minute video at a speed of 30 FPS, a total of 1800 frames are generated. Conventionally, the user may spend a great deal of time scanning the 1800 frames in order to select a frame to be generated as a still image. However, by using the above-describe analysis method illustrated in FIG. 12, the electronic device may select a frame that is meaningful to the user and provide the frame to the user while video capturing. Thus, the user may quickly check a frame recommended by the electronic device and may resume photographing in a photographing spot.

Figure 13A:
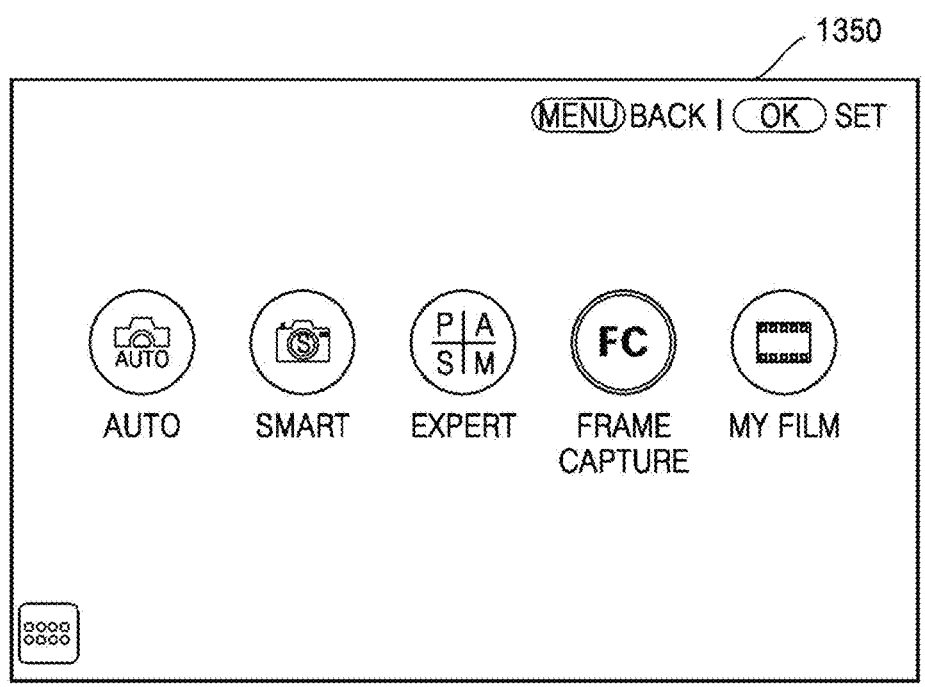
FIG. 13A illustrates a display for selecting a photographing mode for generating a still image after video capturing, according to an embodiment of the present disclosure.
Figure 13B:
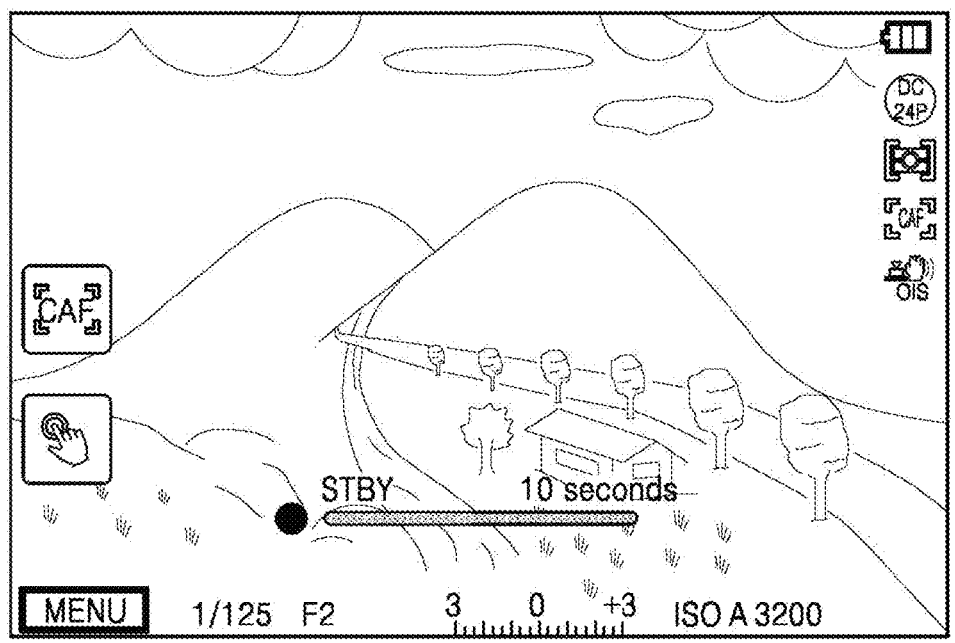
FIG. 13B illustrates a display of a photographing mode for generating a still image after video capturing, according to an embodiment of the present disclosure.

FIG. 13A illustrates a display for selecting a photographing mode for generating a still image after video capturing, according to an embodiment of the present disclosure; and FIG. 13B illustrates a display of a photographing mode for generating a still image after video capturing, according to an embodiment of the present disclosure.

Referring to FIG. 13A, an electronic device displays various photographing modes (auto, smart, expert, frame capture, and my film) on a display unit 1350. Photographing setting values are set based on a user-selected mode. For example, a separate photographing mode for generating a still image after video capturing, e.g., the frame capture mode, may be set. This mode may be stored in the electronic device or may be downloaded in the form of an application by communicating with a separate server.

Upon receiving a signal for entering a photographing mode for generating a still image after video capturing, as illustrated in FIG. 13B, the electronic device displays a photographing parameter on the display unit 1350 in the form of a user interface (UI) to allow setting of the photographing parameter while displaying a screen currently input through an image sensor. After entering the photographing mode for generating a still image after video capturing, the user may set a sensitivity, a shutter speed, an iris value, etc., as in general photographing.

The electronic device may provide various focus modes, e.g., single auto focus (SAF), continuous auto focus (CAF), multi auto focus (MAF), and manual focus (MF). The electronic device may include a touch AF mode. Touch AF is a mode, wherein if the user touches a region to be focused using a finger or a stylus pen, the user performs focusing with respect to that region.

The electronic device may change a focus mode during video capturing as well as prior to video capturing. For example, if the electronic device enters the photographing mode for generating a still image after video capturing, the electronic device may activate an MAF mode to continuously perform focusing by using an input image. During focusing, upon reception of a signal touching a specific region on the display unit, the electronic device performs AF around the selected region.

The electronic device sets a video capturing time of the photographing mode for generating a still image after video capturing. For example, the electronic device may set a video capturing time as 5 seconds, 10 seconds, 15 seconds, etc. The electronic device may set a video capturing time such that photographing continues within a range that is allowed by a capacity of a memory.

The electronic device may resume video capturing. For example, the electronic device may pause video capturing. When the electronic device resume video capturing, the controller 400 adds a currently input image after the taken video. Upon completion of photographing, the electronic device may generate a single video file.

Figure 14:
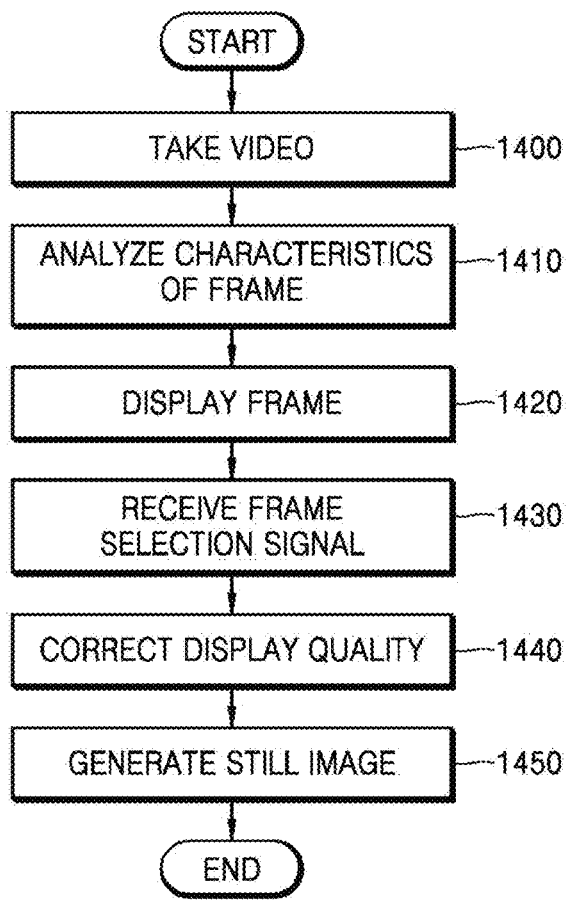
FIG. 14 is a flowchart illustrating a quality correction method with respect to a selected frame, according to an embodiment of the present disclosure.

FIG. 14 is a flowchart illustrating a quality correction method with respect to a selected frame, according to an embodiment of the present disclosure.

Referring to FIG. 14, after the electronic device enters a separate photographing mode for generating a still image after video capturing, a shutter speed may be set higher than a reference shutter speed set in general video capturing, such that a sensitivity value may also be set higher than a sensitivity value set in general video capturing. If a general video is taken at 30 FPS, the video should be taken naturally without disconnection between screens, such that the reference shutter speed may be set to about 1/30 seconds for photographing.

In the photographing mode for generating a still image after video capturing, a final result is not a video, but a still image, such that no shake in each frame included in the video is more important than a seamless video. Thus, in step 1400, the electronic device takes a video with the shutter speed set to 1/60 second or 1/125 second, i.e., higher than 1/30 second.

In this way, the video taken in the foregoing mode may include a little shake in each frame included in the video. If the electronic device sets a high shutter speed, the amount of input light may be reduced, allowing photographing with a high sensitivity. As a result, the electronic device may generate an image including a high-sensitivity noise that is not generated in a low-sensitivity case.

In steps 1410, 1420, and 1430 the electronic device analyzes frames of the video, displays a frame, and receives a selection of the displayed frame as described above.

In step 1440, the electronic device performs quality correction to cancel the generated high-sensitivity noise.

The electronic device may perform quality correction in various manners. For example, the electronic device may compare a correction-needed frame with a previous frame and a following frame, pixel-by-pixel, to correct the frame. The electronic device may apply noise cancelling filters of various types generally known for high-sensitivity noise cancellation to the correction-needed frame.

The electronic device may perform quality correction with respect to a frame to be generated as a still image or with respect to all frames input during video capturing to generate a video file.

In step 1450, the electronic device displays the corrected still image.

Figure 15A:
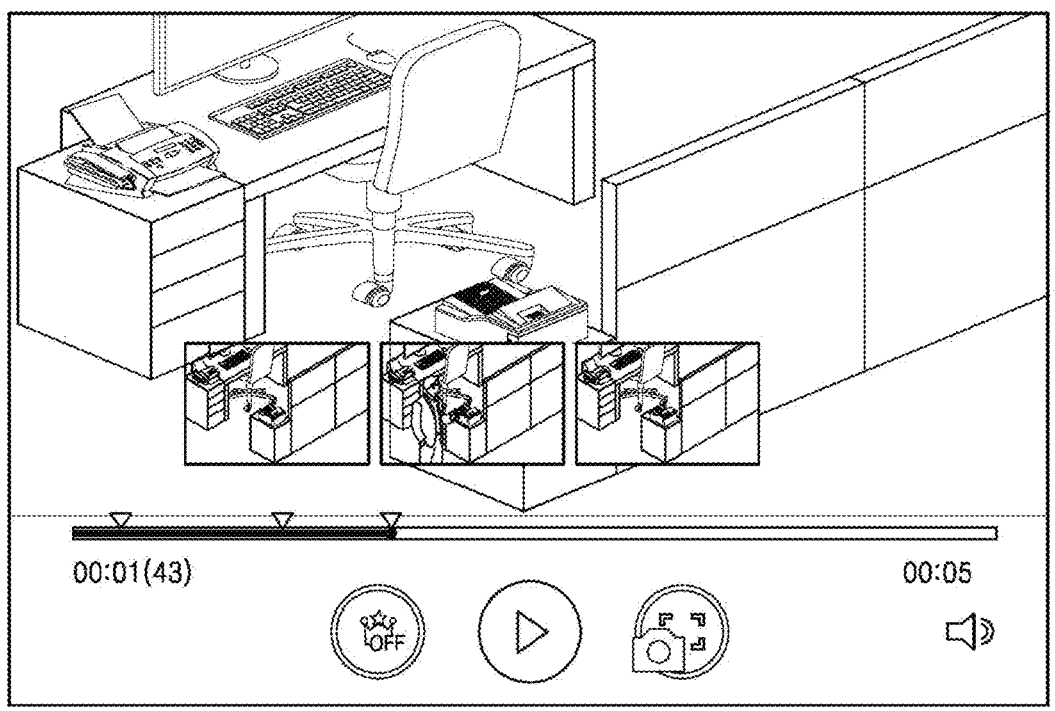
FIG. 15A illustrates displaying of a recommended frame during video playback, according to an embodiment of the present disclosure.
Figure 15B:
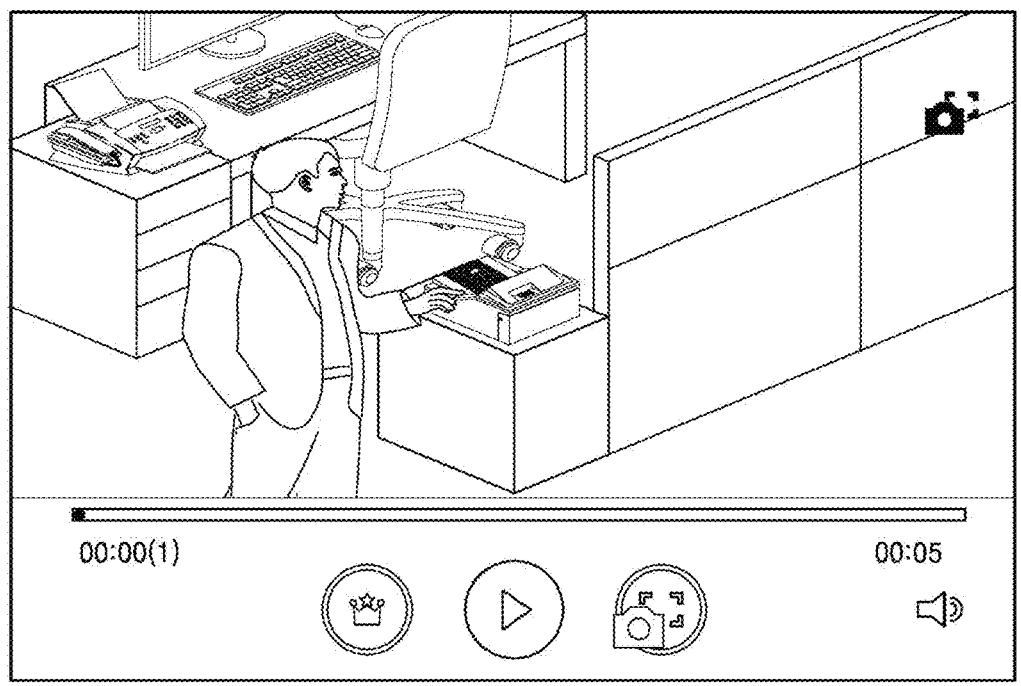
FIG. 15B illustrates a screen in which a recommended frame is selected, according to an embodiment of the present disclosure.

FIGS. 15A and 15B illustrate selection of a frame to be generated as a still image after video capturing. Specifically, FIG. 15A illustrates displaying of a recommended frame during video playback, according to an embodiment of the present disclosure; and FIG. 15B illustrates a screen in which a recommended frame is selected, according to an embodiment of the present disclosure.

Referring to FIG. 15A, the electronic device displays frames 1501 selected by the SAE and the SRE on the display after video capturing. For example, the electronic device may display a selected frame in the form of thumbnails during playback of the taken video.

The electronic device also display times indications 1502 at which the frames are captured on the display in the form of a UI. The electronic device may change the frames displayed on the display or change positions of the displayed frames in response to a signal corresponding to a touch or a drag on the display or a signal corresponding to manipulation of a physical key.

Upon receiving a signal for selecting one of the frames 1501, the electronic device displays a selected frame on the entire screen as illustrated in FIG. 15B.

When displaying a frame on the entire screen, the electronic device may change the displayed frame in response to the signal corresponding to a touch or a drag on the display or the signal corresponding to manipulation of a physical key.

Upon receiving a signal for generating the selected frame as a still image, the electronic device changes the frame into a still image. The generated still image may have the same form as a generally-known still image file. For example, the generated still image may have a Joint Photographic Experts Group (JPEG) file form and may include Exif information.

The electronic device may store a history of generating a still image from a video file in the form of metadata in the video file. For example, the electronic device may store the metadata of the video file, as shown in Table 2, by using a CAPI box tag.

TABLE 2

| CAPI Box Configuration | | |
| --- | --- | --- |
| Field | Field Size | Field Value |
| Size | 4 Bytes | Size of CAPI Box |
| Type | 4 Bytes | "capi" |
| Version | 4 Bytes | Version information of type |
| Info | n Bytes (defined in size) | Whether to capture frame is defined bitwise. e.g.,) For a total of 32 frames, 32 bits are needed, so a 4-byte expression is used and for the second frame, 0x2, 0x0, 0x0, and 0x0 are used. |

For example, CAPI is stored in a user data box udta box of an MP4 file. In table 2, 'Size' indicates a total capacity occupied by CAPI Box, 'Type' indicates a position in which details of current CAPI appears in the user data box, 'Version' indicates a version of current CAPI Box, and 'Info' indicates a frame which is generated as a still image among frames included in a video file.

Figure 16:
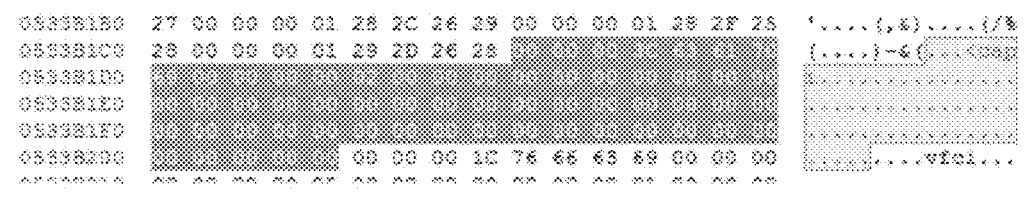

FIG. 16 illustrates storing of a history of generating a still image in a video file by using a CAPI box configuration of Table 2 according to an embodiment of the present disclosure.

The above-described embodiments of the present disclosure may be implemented in the form of program commands that can be executed through various computer components and recorded in a computer-readable recording medium. The computer-readable recording medium may include a program command, a data file, a data structure and the like solely or in a combined manner. Such software may be stored, whether or not erasable or re-recordable, in a volatile or non-volatile storage such as a read-only memory (ROM), a memory such as a random access memory (RAM), a memory chip, a device, or an integrated circuit; and an optically or magnetically recordable and machine (e.g., computer)-readable storage medium such as a compact disc (CD), a DVD, a magnetic disk, or a magnetic tape. A memory that may be included in a mobile terminal is an example of a machine-readable storage medium which is suitable for storing a program or programs including instructions for implementing the present embodiments. The program command recorded in the computer-readable recording medium may be a program command specially designed and configured for the present embodiments or a program command known to be used by those skilled in the art of the computer software field.

According to the above-described embodiments, an electronic device may selectively extract a frame and provide the extracted frame to a user after video capturing.

While the present disclosure has been particularly shown and described with reference to certain embodiments thereof, it will be understood by those of ordinary skill in the art that various changes in form and details may be made therein without departing from the spirit and scope of the present disclosure as defined by the following claims and their equivalents.

What is claimed is:

1. An electronic device comprising:
   an image sensor;
   a display; and
   a processor,
   wherein the processor:
      generates a video file from an image signal input through the image sensor, wherein a sensitivity is set as a value higher than a reference sensitivity if a shutter speed is set as a value higher than a reference shutter speed,
      assigns frame characteristics to each frame included in the video file,
      selects a plurality of frames among the frames included in the video file based on the frame characteristics,
      displays the selected plurality of frames,
      receives a selection of a frame among the displayed selected plurality of frames, and
      generates a still image from the selected frame,
      wherein if the video file is taken at the reference shutter speed or higher then the processor performs quality correction on the selected frame by comparing the selected frame with at least one frame adjacent to the selected frame, prior to generating the still image.

2. The electronic device of claim 1, wherein the processor comprises:
   a scene analysis engine (SAE),
   wherein the SAE analyzes and assigns the frame characteristics, and
   wherein the frame characteristics comprise at least one of:
      a color change,
      a brightness change,
      object detection,
      object recognition, and
      a motion analysis result.

3. The electronic device of claim 2, wherein the SAE comprises:
   a first SAE which analyzes the frame characteristics while generating the video file; and
   a second SAE which analyzes the frame characteristics after the video file is generated.

4. The electronic device of claim 1, wherein the processor comprises:
   a scene recommendation engine (SRE),
   wherein the SRE assigns a priority to the frame characteristics assigned to each frame, and
   wherein selecting a plurality of frames among the frames included in the video file is also based on assigned priorities.

5. The electronic device of claim 1, wherein the processor receives the frame characteristics from an external device, and assigns the received frame characteristics to a frame included in the video file.

6. The electronic device of claim 1, wherein the processor stores, in the video file, information corresponding to a position of the selected frame from which the still image is generated among the frames included in the video file.

7. A method of controlling an electronic device, the method comprising:
   generating a video file using an image signal input through an image sensor, wherein a sensitivity is set as a value higher than a reference sensitivity if a shutter speed is set as a value higher than a reference shutter speed;
   assigning frame characteristics to each frame included in the video file;
   selecting a plurality of frames among the frames included in the video file based on the frame characteristics;
   displaying the selected plurality of frames;
   receiving a selection of a frame among the displayed selected plurality of frames;
   generating a still image from the selected frame; and
   performing quality correction on the selected frame by comparing the selected frame with at least one frame adjacent to the selected frame prior to generating the still image, if the video file is taken at the reference shutter speed or higher.

8. The method of claim 7, wherein assigning the frame characteristics comprises:
   analyzing the frame characteristics,
   wherein the analyzed frame characteristics comprise at least one of:
      a color change,
      a brightness change,
      object detection,
      object recognition, and
      a motion analysis result.

9. The method of claim 8, wherein analyzing the frame characteristics comprises at least one of:
   analyzing the frame characteristics while generating the video file; and
   analyzing the frame characteristics after generating the video file.

10. The method of claim 7, further comprising:
    assigning a priority to the frame characteristics assigned to each frame,
    wherein selecting a plurality of frames among the frames included in the video file is also based on assigned priorities.

11. The method of claim 7, wherein assigning the frame characteristics comprises:
    receiving the frame characteristics from an external device; and
    assigning the received frame characteristics to one or more frames included in the video file.

12. The method of claim 7, further comprising:
    storing, in the video file, information corresponding to a position of the selected frame from which the still image is generated among the frames included in the video file.

13. An electronic device comprising:
    an image sensor;
    a display; and
    a processor,
    wherein the processor:

generates a video file from an image signal input through the image sensor, wherein a sensitivity is set as a value higher than a reference sensitivity if a shutter speed is set as a value higher than a reference shutter speed, enters a photographing mode for generating a still image from the video file, assigns frame characteristics to each frame included in the video file, selects a plurality of frames among the frames included in the video file based on the frame characteristics, displays, on the display, the selected plurality of frames from the frames included in the video file, receives a selection of a frame among the displayed selected plurality of frames, and generates a still image from the selected frame, wherein if the video file is taken at the reference shutter speed or higher then the processor performs quality correction on the selected frame by comparing the selected frame with at least one frame adjacent to the selected frame, prior to generating the still image.

14. The electronic device of claim 13, wherein the processor comprises:

a scene analysis engine (SAE), wherein the SAE analyzes and assigns the frame characteristics, and wherein the frame characteristics comprise at least one of:
color change analysis,
brightness change analysis,
object detection,
object recognition, and
motion analysis.

15. The electronic device of claim 14, wherein the SAE comprises:

a first SAE which analyzes the frame characteristics while generating the video file; and a second SAE which analyzes the frame characteristics after the video file is generated.

16. The electronic device of claim 13, wherein the processor comprises:

a scene recommendation engine (SRE), wherein the SRE assigns a priority to the frame characteristics, and wherein selecting a plurality of frames among the frames included in the video file is also based on assigned priorities.

* * * * *